United States Patent [19]
Resnick

[11] 3,896,179
[45] July 22, 1975

[54] DECOMPOSITION OF UNSTABLE ISOMERS

[75] Inventor: Paul Raphael Resnick, Wilmington, Del.

[73] Assignee: E. I. du Pont de Nemours & Company, Wilmington, Del.

[22] Filed: Apr. 23, 1973

[21] Appl. No.: 353,882

Related U.S. Application Data

[63] Continuation-in-part of Ser. No. 44,111, June 8, 1970, abandoned.

[52] U.S. Cl. ......... 260/616; 260/544 F; 260/611 R; 260/614 F; 260/615 F; 260/653.3
[51] Int. Cl. ............................................ C07c 41/12
[58] Field of Search ......... 260/614 F, 615 F, 615 R, 260/615 BF, 616, 611 R

[56] References Cited
UNITED STATES PATENTS

| | | | |
|---|---|---|---|
| 3,114,778 | 12/1963 | Fritz et al. | 260/614 |
| 3,274,239 | 9/1966 | Selman | 260/514 |
| 3,321,532 | 5/1967 | Lorenz | 260/614 |

*Primary Examiner*—Howard T. Mars

[57] ABSTRACT

A process of preparing primary isomers of substantially fluorinated (alkyl vinyl) ethers from mixtures of isomers of substantially fluorinated (alkyl vinyl) ethers by selective pyrolysis of said mixture of isomers followed by separation and recovery of the primary isomer.

4 Claims, 1 Drawing Figure

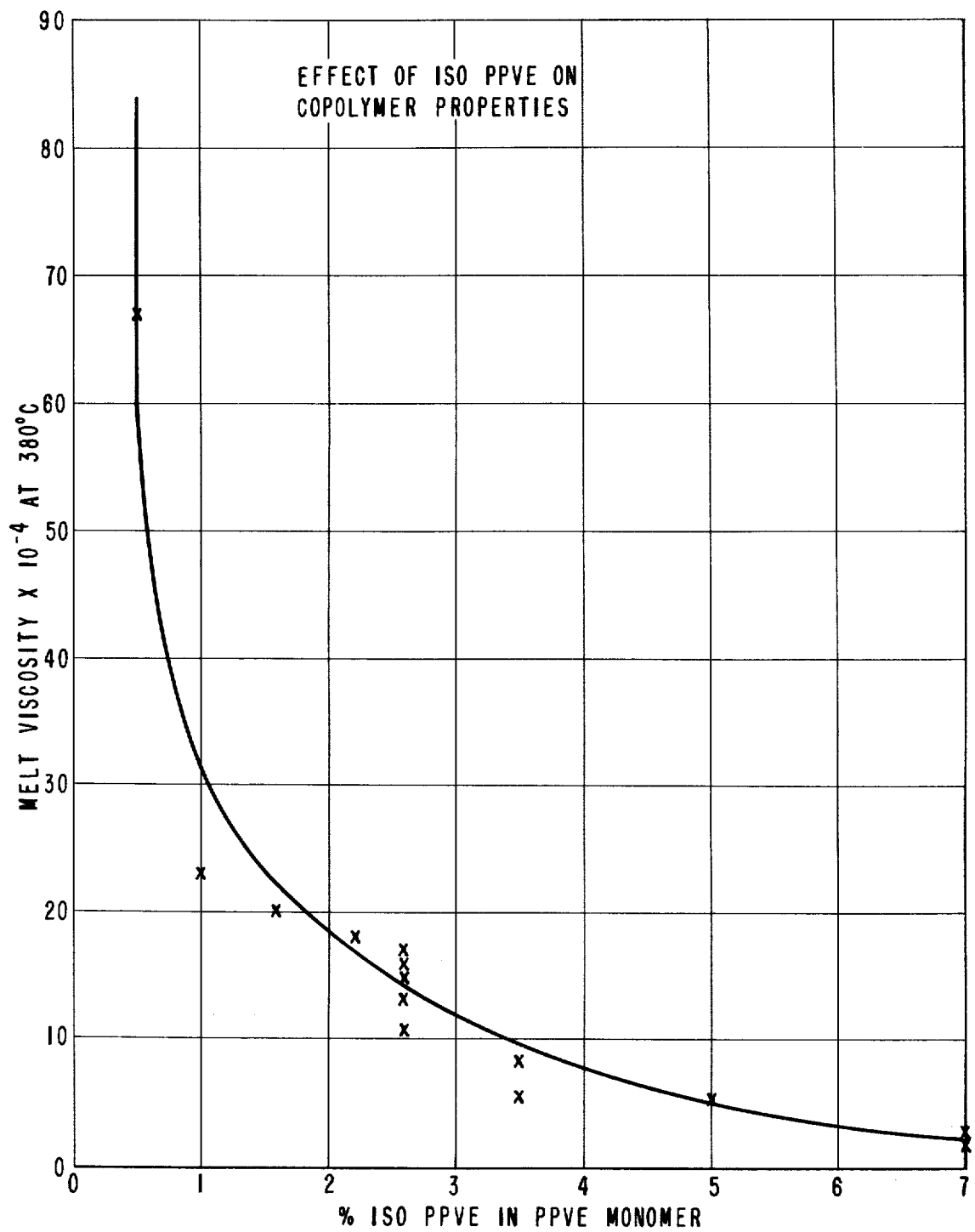

DECOMPOSITION OF UNSTABLE ISOMERS

This is a continuation-in-part of application Ser. No. 44,111 filed June 8, 1970, now abandoned.

This invention relates to the preparation of substantially fluorinated vinyl ethers in substantially pure form. More specifically, this invention relates to the process of preparing pure substantially fluorinated fluorovinyl ethers by selectively destroying secondary and tertiary isomers present therewith and recovering the primary isomers.

The invention also relates to a process for producing primary isomers of substantially fluorinated vinyl ethers substantially free of either or both secondary or tertiary isomers and a method for separating primary isomers from the products of rearrangement of secondary and tertiary isomers. The monomeric isomers have the formula $ROCF=CF_2$ where R is a substantially fluorinated alkyl radical.

The primary isomers of the present invention are useful in the process for polymerizing tetrafluoroethylene with primary isomers of substantially fluorinated vinyl ethers to yield copolymers of tetrafluoroethylene and substantially fluorinated vinyl ethers having outstanding properties. The inert properties of polytetrafluoroethylene are combined with melt fabricability. It has now been found that those properties can be improved by removing certain isomers associated with the monomeric perfluorovinyl ether which isomers may act as chain transfer agents resulting in low molecular weight copolymer.

The process of separating the primary isomers of perfluorovinyl ethers of this invention from the secondary and tertiary isomers is carried out by selective destruction of the secondary and tertiary isomer present by heating the mixture between the temperatures of 250°–350°C. Each of the isomers will be affected to some degree. However, it is found that either or both secondary and tertiary isomers will rearrange almost completely into a form which can be easily removed by distillation or extraction.

The process of this invention for preparing substantially pure primary isomer of compounds having the formula $ROCF=CF_2$ where R is a substantially fluorinated alkyl or alkoxyalkyl radical having 3 to 7 carbon and oxygen atoms in the chain, the other isomers having the same number of fluorine and oxygen atoms per molecule as the primary isomer, is characterized by heating a mixture consisting essentially of said isomers at a temperature of between 250°–350°C. and separating and recovering the primary isomer. Preferably, the temperature is at least 300°C.

In one embodiment the carbon atom of the alkyl or alkoxyalkyl radical bonded to the oxygen represented by R is also bonded only to atoms from the class consisting of carbon and fluorine.

In another embodiment the primary isomer is perfluoro-(propyl vinyl)ether and there is also present perfluoro(isopropyl vinyl)ether.

Thus, the process of the invention for purifying perfluorovinyl ether compounds having the formula $ROCF=CF_2$ where R is a polyfluorinated alkyl or alkoxyalkyl radical of 3 to 7 carbon and oxygen atoms in the chain comprises pyrolyzing a mixture consisting essentially of the primary and other isomers of said perfluorovinyl ether compounds at a temperature of 250°–350°C., scrubbing the resulting mixture with caustic solution and separating substantially pure primary isomer by distillation.

Typical copolymerization methods for polymerizing tetrafluoroethylene and vinyl ethers are described in U.S. Pat. Nos. 3,282,875 and 3,132,123.

Preferably, the isomer to be copolymerized with tetrafluoroethylene is perfluoro(propyl vinyl) ether.

This invention also comprises the process of preparing the primary isomer of an alkyl vinyl ether such as perfluoro(propyl vinyl)ether by pyrolyzing a compound of the group consisting of the corresponding acid fluoride $[ROCF(CF_3)COF]$ or the alkali metal salt $[ROCF(CF_3)COOAlkali\ metal]$ of the said fluoride wherein R is defined as above at a temperature of 75° to 600°C. and subsequently separating the primary isomer from the other isomers formed therewith by heating the mixture substantially free of acid halide at a temperature of between 250°–350°C., separating and recovering the primary isomer.

By substantially fluorinated is meant that at least 40 percent and preferably at least 50 percent of the hydrogen in R (the alkyl or alkoxyalkyl group) is replaced by fluorine. It will be understood that substantially fluorinated includes perfluorinated. R has at least 3 carbon atoms. While for purposes of the separation of isomers, no upper limit is necessary on the number of carbons in R, for practical purposes compounds with an R group of 15 or less carbon atoms are more likely to be used. In the preferred compounds R is an alkyl or alkoxyalkyl radical having 3 to 7 carbon and oxygen atoms in the chain. Perfluorinated side chains may additionally be present.

A primary isomer is one in which the $OCF=CF_2$ group is connected to a $CF_2$ group in the R group. A secondary isomer is one in which the $OCF=CF_2$ group is connected to a $>CF$ in the R group. A tertiary isomer is one in which the $OCF=CF_2$ group is connected to a

(carbon) bearing no fluorine. In all cases the carbon (C) of the R group bonded to the oxygen in the $OCF=CF_2$ group is not directly bonded to hydrogen.

By substantially free of secondary or tertiary isomer is meant that the primary isomer has less than 0.6 percent by weight of the secondary or tertiary isomer present. Preferably less than 0.3 percent by weight of said isomer is present and most preferably less than 0.1 percent by weight of said isomer. It is commercially desirable to prepare copolymers of tetrafluoroethylene and vinyl ethers from the primary isomer of the vinyl ether which is substantially free of members of the class consisting of secondary and tertiary isomer and preferably contains less than 0.3 percent thereof and most preferably less than 0.1 percent thereof.

Typically, the amount of secondary and tertiary isomer associated with the primary isomer in the production of the vinyl ether is usually less than 16.7 percent by weight and greater than 0.3 percent by weight and most often, greater than 0.6 percent by weight. Thus, in its most significant embodiment, the process of this invention processes a feed stream containing less than 16.7 percent by weight and greater than 0.6 percent by weight of members of the class of secondary and tertiary isomer to a product stream with a concentration of less than 0.6 percent by weight of members of that class. Preferably, the feed stream contains less than 16.7 percent by weight and greater than 0.3 percent by weight of members of the class of secondary and tertiary isomers and the product stream contains less than 0.3 percent by weight of members of that class.

Specifically, perfluoro(isopropyl vinyl)ether (iso PPVE) may be separated from perfluoro normal (propyl vinyl) ether (PPVE) by selective pyrolysis. Without being bound thereby, it is believed that the perfluoro(isopropyl vinyl) ether rearranges to perfluoro-3-methylbutyrylfluoride which may then be decarboxylated to perfluoroisobutene in the presence of hot sodium carbonate. The perfluoroisobutene may be separated from the desired PPVE by distillation. Any unreacted perfluoro-3-methylbutyrylfluoride may be separated from the desired PPVE by extraction with aqueous base.

This process also includes within its scope steps of pyrolysis of the isomer followed by decarboxylation by known methods, in order to separate secondary and tertiary isomers from the desired primary fluorovinyl ethers.

The invention is carried out at a temperature of between 250°–350°C. The temperature selected is dependent upon the contact time with the mixture of isomers. The contact time is inversely related to the temperature. Thus, while a contact time of 22 seconds is sufficient at a temperature of 280°C. to 320°C., at a temperature of 350°C. as little as 3 seconds or even 1 second would be expected as a contact time to reduce the undesirable isomer below 0.3 percent. There is no upper limit on contact time except that which economics and convenience dictate.

The methods below may be used to determine the amount of secondary and tertiary isomers mixed with the primary isomer.

For example, the concentration of iso-PPVE relative to PPVE is determined by converting the unsaturated perfluoroethers to the corresponding hydro-ethers formed by addition of the elements of hydrogen fluoride across the double bond and then completing the analysis chromatographically. Conversion to the hydro-ethers is accomplished by the following procedure.

There are added 5 grams CsF, 50 ml. dimethyl formamide, 2.5 ml. water and 7 ml. of PPVE to a 100 ml. round-bottom flask fitted with a water-cooled reflux condenser. The mixture is stirred at room temperature for at least 4 hours to convert the ethers to the hydro ethers, for example, as follows:

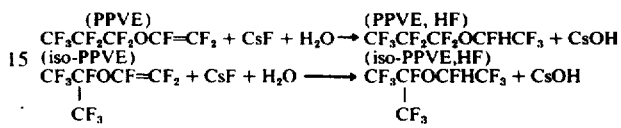

The reaction mixture is then poured into 400 ml. of water. The lower layer is separated, washed with water, dried with calcium chloride, and then analyzed by chromatography in a column 12 feet long by ¼ inch diameter comprising tetraethylene glycol dimethyl ether on an inert carrier such as "Chromosorb P." If the column is operated at room temperature and a helium flow rate of 60 ml/min., approximate retention times will be 2.2 minutes for PPVE HF and 3.1 minutes for iso-PPVE HF.

Analytical results based on these chromatographic methods depend in part on the integration of the curves for their accuracy. Unless otherwise specified in the Examples which follow, these techniques were used to measure isomer content. In the examples, integration was carried out by weighing the areas of chart paper under the chromatographic curves or graphically. It is estimated that experimental error is of the order of 0.02 percent concentration by weight of isomer in the results reported.

Typical perfluorovinyl ethers which may be separated by the process of this invention include:

| MORE STABLE | FROM LESS STABLE |
|---|---|
| | (May be separated) |
| $CF_3CF_2CF_2CF_2OCF=CF_2$ | $CF_3CF_2\underset{\underset{CF_3}{\mid}}{C}FOCF=CF_2$ |
| $CF_3\underset{\underset{CF_3}{\mid}}{C}FCF_2OCF=CF_2$ | $CF_3\underset{\underset{CF_3}{\mid}}{\overset{\overset{CF_3}{\mid}}{C}}OCF=CF_2$ |
| $R_fCF_2OCF=CF_2$ | $R_f'\underset{\underset{CF_3}{\mid}}{C}FOCF=CF_2$* |
| | $R_f''\underset{\underset{CF_3}{\mid}}{\overset{\overset{CF_3}{\mid}}{C}}OCF=CF_2$* |
| $CF_3CF_2CF_2CF_2CF_2OCF=CF_2$ | $CF_3CF_2CF_2\underset{\underset{CF_3}{\mid}}{C}FOCF=CF_2$ |
| $CF_2\!\!\underset{CF_2-CF_2}{\overset{CF_2-CF_2}{<\!\!\!>}}\!\!CF-CF_2OCF=CF_2$ | $CF_3-CF\!\!\underset{CF_2-CF_2}{\overset{CF_2-CF_2}{<\!\!\!>}}\!\!CFOCF=CF_2$ |
| $CF_3\underset{\underset{CF_3}{\mid}}{C}FCF_2\ CF_2OCF=CF_2$ | $CF_3CF_2\underset{\underset{CF_2CF_3}{\mid}}{C}FOCF=CF_2$ |
| $CF_3CF_2\underset{\underset{CF_3}{\mid}}{C}FCF_2OCF=CF_2$ | $CF_3$ |
| | $CF_3CF_2\underset{\underset{CF_3}{\mid}}{C}-OCF=CF_2$ |

| MORE STABLE | —Continued<br>FROM LESS STABLE |
|---|---|
| $CF_2ClCFClCF_2OCF=CF_2$ | $CF_2ClCFOCF=CF_2$<br>$\quad\quad\mid$<br>$\quad\quad CF_2Cl$ |
| $CF_3CF_2CF_2OCF=CF_2$ | $CF_3CFOCF=CF_2$<br>$\quad\quad\mid$<br>$\quad\quad CF_3$ |
| $CF_3CF_2CF_2OCFCF_2OCF=CF_2$<br>$\quad\quad\quad\quad\quad\mid$<br>$\quad\quad\quad\quad\quad CF_3$ | $CF_3CF_2CF_2OCF_2CFOCF=CF_2$<br>$\quad\quad\quad\quad\quad\quad\mid$<br>$\quad\quad\quad\quad\quad\quad CF_3$ |

*$R_f'$ contains one $CF_2$ less than $R_f$
$R_f''$ contains two $CF_2$ groups less than $R_f$ Vinyl ethers may be prepared by reaction of the appropriate acyl fluoride or ketones with hexafluoropropylene oxide (HFPO) followed by decarboxylation in situ of the sodium salt made from the acyl fluoride product. A general procedure for this synthesis is found in U.S. Pat. Nos. 3,114,778; 3,250,808; 3,274,239 and 3,291,843.

Perfluorovinyl ethers may be prepared typically by the following processes, the results of which will include minor amounts of isomeric perfluorovinyl ethers and may then be purified in accordance with the process of the present invention.

Perfluorovaleryl fluoride (described in U.S. Pat. Nos. 2,567,011; and 2,765,326) is converted to perfluoro(3-oxa-1-octene), perfluoromethylisopropyl ketone (described in U.S. Pat. No. 3,185,734) is converted to perfluoro(3-oxa-4,5-dimethyl-1-hexene), and perfluorodiethyl ketone (described in U.S. Pat. No. 3,091,643) is converted to perfluoro(3-oxa-4-ethyl-1-hexene).

The mixture of perfluoro(3,6-dioxa-5-methyl-1-nonene) and perfluoro(3,6-dioxa-4-methyl-1-nonene) is prepared by decarboxylation of the sodium salt of the acyl fluoride product formed by the reaction of hexafluoropropylene oxide and tetraethylammonium fluoride (U.S. Pat. Nos. 3,250,808; 3,291,843 and British Pat. No. 976,136).

The term "melt viscosity" means the apparent melt viscosity as measured at 380°C. under a shear stress of 6.5 pounds per square inch. The melt viscosity is determined by using a melt indexer of the type described in ASTM D 1238-52-T, modified for corrosion resistance to embody a cylinder, orifice, and piston weighing about 50 grams, made of stellite cobalt-chromium-tungsten alloy. The resin (5.0 grams) is charged the 0.375 inch I. D. cylinder which is held at 380°C. ± 5°C. and allowed to come to equilibrium temperature during 5 minutes. Then it is extruded through the 0.0825 inch diameter, 0.315 inch long orifice under a piston loading of 5,000 grams. The melt viscosity in poises is calculated as 53,150 divided by the observed extrusion rate in grams per minute.

In the Examples which follow, all parts are by weight unless otherwise indicated.

EXAMPLE 1

Preparation of Perfluoropropylvinyl Ethers

A 1-gallon stainless steel autoclave fitted with a stirrer, gas inlet tube, and decanter was charged with 2.7 liters of a 1.5 percent solution of tetraethylammonium bromide in acetonitrile. Hexafluoropropylene oxide was added at 35°–45°C. at a total reactor pressure of 80 psig. The crude product was removed continuously by decantation and distilled to give a mixture of perfluoro-2-n-propoxypionyl fluoride and perfluoro-2-isopropoxypropionyl fluoride.

A stainless steel tube four inches in diameter and five feet long was filled with 10 pounds of anhydrous sodium carbonate and the sodium carbonate fluidized with carbon dioxide. The reactor was heated to 250°C. and the above mixture of propionyl fluorides added at the rate of 10 pounds per hour. The crude product was scrubbed with aqueous base and distilled to give perfluoro-n-propylvinyl ether containing 0.66 percent perfluoro-isopropylvinyl ether.

EXAMPLE 2

Copolymer of TFE/PPVE is prepared by the following procedure:

Into an evacuated stainless steel 100 ml. autoclave fitted with a magnetically driven stirrer is placed a solution of 9 g. of perfluoropropyl perfluorovinyl ether (0.034 mol) in 64 ml. of perfluorodimethylcyclobutane. The solution is heated to 60°C., whereupon tetrafluoroethylene is admitted to the autoclave until a pressure of 268 psig is attained. To the rapidly stirred mixture is added approximately $10^{-4}$ mol of $N_2F_2$ diluted with nitrogen. The contents of the autoclave are heated and stirred for 1 hour at 60°C., and then cooled and gaseous materials vented off. The solid polymer obtained weighs 15.0 g. and has a melt viscosity at 380°C. of $3.6 \times 10^4$ poises. Films of the copolymer pressed at 350°C. and 20,000 psi platen pressure are tough, clear and colorless. Infrared analysis of the resin indicates the presence of 9.7 wt. percent perfluoro(propyl vinyl)ether.

EXAMPLE 3

The effect of percent secondary isomer of PPVE monomer on molecular weight of TFE/PPVE copolymer made from said monomer is shown in the FIGURE attached. Monomer is prepared by the processes of Example 1 and polymer by the process of Example 2.

EXAMPLES SHOWING THE SEPARATION OF ISOMERS

EXAMPLE 4

The primary isomer PPVE and the other isomers incidental to production of the primary isomer according to the method of Example 1 were passed through a tube over sodium carbonate at the temperatures indicated. The average contact time over sodium carbonate was 22 seconds. The feed and product concentrations of the undesirable isomer are listed in addition to the percent product recovery of the desirable isomer.

| Temp. | percent of A in $CF_3CF_2CF_2OCF=CF_2$ | | (PPVE) Product Recovery |
| --- | --- | --- | --- |
| | Feed | Product | |
| 250 | 0.66 | 0.61 | 95% |
| 280 | 0.50 | 0.23 | — |
| 300 | 0.65 | 0.10 | 97% |
| 300 | 0.37 | 0.10 | 90% |
| 300 | 0.37 | 0.08 | 95% |
| 300 | 0.37 | 0.10 | 97% |
| 300 | 0.37 | 0.07 | 93% |
| 300 | 0.37 | 0.08 | 97% |
| 300 | 0.37 | 0.15 | 91% |
| 320 | 0.26 | 0.10 | 88% |

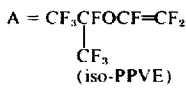

A = $CF_3CFOCF=CF_2$
      |
      $CF_3$
(iso-PPVE)

EXAMPLE 5

A stainless steel tube 4 inches in diameter and 5 feet long was filled with 10 pounds of anhydrous sodium carbonate. The tube was heated to 300°C. and the sodium carbonate fluidized. Then 11.5 pounds of PPVE containing 0.65 percent iso-PPVE was fed through the tube in 68 minutes. The average contact time was 55 seconds. After pyrolysis the normal PPVE was separated from the acid fluoride products of the decomposition of iso-PPVE by scrubbing with caustic solution followed by distillation. The PPVE recovered weighed 11.2 pounds and contained 0.10 percent iso-PPVE.

Analogous experiments were performed using potassium carbonate, glass beads or stainless steel mesh in place of the sodium carbonate. However, because of ease in handling, heat transfer, etc., the use of carbonate is preferred.

EXAMPLE 6

A. This Part A is a comparative Example and when compared with Parts B and C below shows the effect of contact time on the process described herein. A perfluorinated vinyl ether mixture was passed through a 12 inch by 1 inch diameter glass tube heated by a split tube furnace. The average contact time was less than 90 seconds. The vinyl ether mixture vapor was carried by a stream of nitrogen through the glass tube into multiple cold traps in which the reaction product was collected.

The tube was heated to 300°C. and 6.00 g of a mixture containing 83.3 percent perfluoro (3-oxa-1-octene) and 16.7 percent perfluoro-(3-oxa-4-ethyl-1-hexene) passed through the tube in 8 minutes. Infrared spectral analysis of the vinyl ether product showed it to be a mixture of 98 percent perfluoro (3-oxa-1-octene) and 2 percent perfluoro-(3-oxa-4-ethyl-1-hexene).

B. Using the apparatus and procedure of Example 6A, the tube was heated to 275°C. and 2.30 g. of a mixture containing 87.0 percent perfluoro(3-oxa-1-octene) and 13.0 percent perfluoro(3-oxa-4-ethyl-1-hexene) passed through the tube in 4 minutes for an average contact time of less than 130 seconds. Infrared spectral analysis of the vinyl ether product showed it to be all perfluoro(3-oxa-1-octene).

C. Using the apparatus and procedure of Example 6A, the tube was heated to 275°C. and 2.30 g. of a mixture containing 87 percent perfluoro(3-oxa-1-octene) and 13 percent perfluoro(3-oxa-4,5-dimethyl-1-hexene) passed through the tube in 3.5 minutes for an average contact time of less than 114 seconds. Infrared spectral analysis of the vinyl ether product showed it to be all perfluoro-(3-oxa-1-octene).

EXAMPLE 7

Using the apparatus and procedure of Example 6A, the tube was heated to 275°C. and 6.1 g. of a mixture containing 90.6 percent perfluoro(3,6-dioxa-5-methyl-1-nonene) and 9.4 percent perfluoro(3,6-dioxa-4-methyl-1-nonene) passed through the tube in 21 minutes for an average contact time of less than 306 seconds. The vinyl ether product was converted by reaction with cesium fluoride, dimethyl formamide and water to a mixture of 98.8 percent perfluoro(3,6-dioxa-5-methyl-2-hydrononane) and 1.2 percent perfluoro(3-,6-dioxa-4-methyl-2-hydrononane) showing that the percentage of perfluoro(3,6-dioxa-4-methyl-1-nonene) in the vinyl ether mixture had decreased from 9.4 percent to 1.2 percent upon heating.

EXAMPLE 8

Using the apparatus and procedure of Example 6A, the tube was heated to 275°C. and 8.5 g. of the same mixture used in Example 9 passed through the tube in 3.0 minutes for an average contact time of less than 31 seconds. The vinyl ether product, 6.9 g., was treated as in Example 9 to give a mixture of 97.8 percent perfluoro(3,6-dioxa-5-methyl-2-hydrononane) and 2.2 percent perfluoro(3,6-dioxa-4-methyl-2-hydrononane) showing that the percentage of perfluoro(3,6-dioxa-4-methyl-1-nonene) in the vinyl ether mixture had decreased from 9.4 to 2.2 percent upon heating.

The purified isomer is useful at least in preparing copolymers with TFE having utility as self-supporting films and molded articles. The copolymers of TFE and the purified isomers are melt fabricable.

The foregoing detailed description has been given for clarity of understanding only and no unnecessary limitations are to be understood therefrom. The invention is not limited to exact details shown and described for obvious modifications will occur to one skilled in the art.

The invention claimed is:

1. Process for preparing substantially pure primary isomer from a mixture of primary and secondary and/or tertiary isomers wherein said isomers are represented by the formula $ROCF=CF_2$ where R is a perfluorinated alkyl radical having 3 to 7 carbon atoms, and wherein the primary isomer is one in which the $—OCF=CF_2$ is connected to a $>CF_2$ group in R, the secondary isomer is one in which the $—OCF=CF_2$ is connected to a $>CF$ group in R and the tertiary isomer is one in which the $—OCF=CF_2$ is connected to a $$\begin{array}{c} | \\ -C- \\ | \end{array}$$

carbon bearing no fluorine atoms, which comprises heating a mixture consisting essentially of said isomers in which the combined concentration of secondary and/or tertiary isomers present is at least 0.6 percent and less than 16.7 percent by weight of the mixture at a temperature of between 250° and 350°C. for a time sufficient to selectively destroy the secondary and/or tertiary isomers until the combined concentration of the secondary and/or tertiary isomers is below 0.6 percent by weight of the mixture.

2. The process of claim 1 wherein the primary isomer is perfluoro(proply vinyl) ether and there is also present the secondary isomer perfluoro (isopropyl vinyl) ether.

3. Process for preparing substantially pure primary isomer from a mixture of primary and secondary and/or tertiary isomers wherein said isomers are represented by the formula $ROCF=CF_2$ where R is a perfluorinated alkyl radical having 3 to 7 carbon atoms, and wherein the primary isomer is one in which the $-OCF=CF_2$ is connected to a $\rightarrow CF_2$ group in R, the secondary isomer is one in which the $-OCF=CF_2$ is connected to a $>CF$ group in R and the tertiary isomer is one in which the $-OCF=CF_2$ is connected to a

carbon bearing no fluorine atoms, which comprises, heating a mixture consisting essentially of said isomers in which the combined concentration of secondary and/or tertiary isomers present is at least 0.3 percent and less than 16.7 percent by weight of the mixture at a temperature of between 250° and 350°C. for a time sufficient to selectively destroy the secondary and/or tertiary isomers until the combined concentration of the secondary and/or tertiary isomers is below 0.3 percent by weight of the mixture.

4. Process for preparing substantially pure primary isomer from a mixture of primary and secondary and/or tertiary isomers wherein said isomers are represented by the formula $ROCF=CF_2$ where R is a perfluorinated alkyl radical having 3 to 7 carbon atoms, and wherein the primary isomer is one in which the $-OCF=CF_2$ is connected to a $>CF_2$ group in R, the secondary isomer is one in which the $-OCF=CF_2$ is connected to a $>CF$ group in R and the tertiary isomer is one in which the $-OCF=CF_2$ is connected to a

carbon bearing no fluorine atoms, which comprises, heating a mixture consisting essentially of said isomers in which the combined concentration of secondary and/or tertiary isomers present is at least 0.1 percent and less than 16.7 percent by weight of the mixture at a temperature of between 250° and 350°C. for a time sufficient to selectively destroy the secondary and/or tertiary isomers until the combined concentration of the secondary and/or tertiary isomers is below 0.1 percent by weight of the mixture.

* * * * *

UNITED STATES PATENT OFFICE
CERTIFICATE OF CORRECTION

PATENT NO. : 3,896,179
DATED : July 22, 1975
INVENTOR(S) : Paul Raphael Resnick

It is certified that error appears in the above-identified patent and that said Letters Patent are hereby corrected as shown below:

IN THE CLAIMS:

Column 8, line 50 ">CF$_2$" should read -- >CF$_2$ --.

Column 9, line 12 ">CF$_2$" should read -- >CF$_2$ --.

Column 9, line 13 ">CF" should read -- >CF --.

Column 10, line 9 ">CF$_2$" should read -- >CF$_2$ --.

Column 10, line 10 ">CF" should read -- >CF --.

Signed and Sealed this seventeenth Day of February 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,896,179
DATED : July 22, 1975
INVENTOR(S) : Paul Raphael Resnick

It is certified that error appears in the above-identified patent and that said Letters Patent are hereby corrected as shown below:

IN THE CLAIMS:

Column 8, line 51 " $\gtrless$CF" should read -- $\gneqq$CF --.

Signed and Sealed this twenty-third Day of March 1976

[SEAL]

Attest:

RUTH C. MASON
*Attesting Officer*

C. MARSHALL DANN
*Commissioner of Patents and Trademarks*